Sept. 6, 1966  SHIGERU MAEHARA ET AL  3,271,129
METHOD OF RECOVERING AN UNBURNT WASTE GAS PRODUCED
IN AN OXYGEN TOP-BLOWING CONVERTER
Filed April 22, 1963

INVENTORS
SHIGERU MAEHARA
ISOJI IGARASHI

BY Wenderoth, Lind & Ponack

ATTORNEYS

United States Patent Office 3,271,129
Patented Sept. 6, 1966

3,271,129
METHOD OF RECOVERING AN UNBURNT WASTE GAS PRODUCED IN AN OXYGEN TOP-BLOWING CONVERTER
Shigeru Maehara and Isoji Garashi, Yawata District, Fukuoka, Japan, assignors to Yawata Iron & Steel Co., Ltd., and Yokoyama Engineering Co., Ltd., Tokyo, Japan, both corporations of Japan
Filed Apr. 22, 1963, Ser. No. 274,545
Claims priority, application Japan, Apr. 24, 1962, 37/16,573
3 Claims. (Cl. 75—60)

This invention relates to a method of recovering unburned waste gas produced in an oxygen top-blowing converter in which recovery method the waste gas is burned in the beginning and ending periods of blowing and the valuable waste gas in the maximum period of the blowing is recovered in the unburned condition.

The waste gas released from a converter is valuable gas containing 80 to 95% CO. However, during the top-blowing converter operation, when the amount of oxygen in the waste gas which is produced comes within the explosion range, the oxygen will quickly react with CO in the waste gas and there is a danger of an explosion.

Further, at the start of blowing, when the reaction of Si contained in the molten pig iron with the $O_2$ being blown in begins, the rate of decarburizing of the carbon contained in the molten pig iron will still be so low and the amount of gas flowing through the recovery apparatus will be so small that the operation of the induced draft fan will become unstable.

In this period, the reaction condition of the molten pig iron will cause slopping and slag will be splashed onto the skirt, inside of which there are only $N_2$, partially burned $CO_2$ or unburned CO. Therefore, heat transfer to the slag will be so small that the slag will coagulate and stick to the skirt, so that the vertical movement of the skirt will become difficult.

The inventors have succeeded in providing a method, by which various defects in the conventional method of recovering the waste gas produced in the oxygen top-blowing converter can be eliminated.

An object of the present invention is to prevent an accidental explosion from occurring during the beginning and ending periods of blowing where there is a danger of explosion.

Another object of the present invention is to reduce the instability of the induced draft fan during the beginning and ending periods of blowing, where the amount of the gas produced is small and to stabilize the control of the internal pressure in the cooler.

A further object of the present invention is to prevent the slag from being deposited on the skirt during the beginning period of blowing, thereby to smooth the up-and-down movement of the skirt.

Still another object of the present invention is to accelerate desiliconing and decarburization during the beginning period of blowing.

A further object of the present invention is to save the inert gas and to facilitate confirmation of the end point of the decarburizing reaction during the ending period of blowing.

That is to say, the present invention provides a method wherein, during the beginning and ending periods of oxygen blowing, a large clearance is provided between the skirt and the furnace through which air is positively sucked in. The produced gas is burned with the air sucked in and non-reacted blowing oxygen and the products of combustion are released. During the maximum period of oxygen blowing, the produced gas is recovered in the unburned condition.

According to the method of the present invention as above mentioned, during the beginning and ending periods of blowing, the amount of the waste gas will increase due to air being sucked in adjacent the furnace mouth, and the operation of the induced draft fan will be stabilized and the internal pressure of the cooler will become stable. Further, as the skirt is lifted up, any slag which slops will not reach the skirt. Even if some slag is deposited on the skirt, the heat transferred to the skirt part will be sufficient due to the radiant heat of the molten steel and the temperature of the burned gas to cause the deposited slag to drop in a half-molten or entirely molten state in the furnace. Further, inert gas can be saved and all the above mentioned objects can be attained.

An embodiment of the present invention will now be detailed with reference to the drawings in which.

Figure 1:
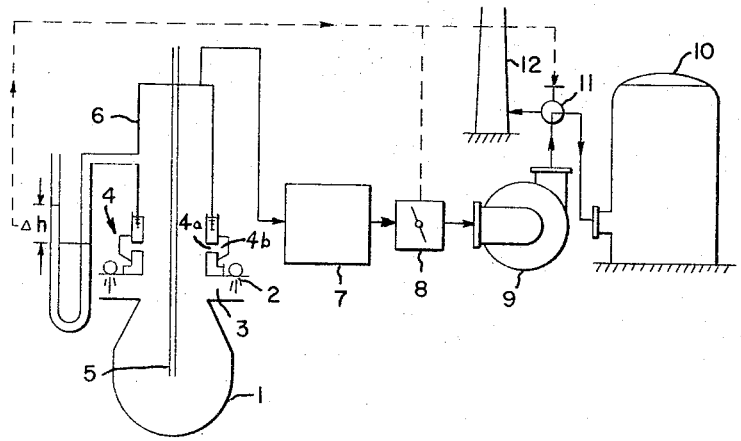
FIGURE 1 is a schematic view of an apparatus for recovering in the unburned condition waste gas produced in an oxygen top-blowing converter.

In FIGURE 1, gas generated in a converter 1 is emitted from the converter mouth 3 into a vertically movable skirt 4 on a cooler 6. Skirt 4 has a gas curtain forming jet emitting ring 2 thereon which can form a gas curtain between the skirt 4 and converter mouth 3. An oxygen lance is shown at 5. The gas is cooled in cooler 6 and passes into a dust collector 7 and past a gas flow control valve 8, being drawn by an induced draft fan 9. Fan 9 pumps the gas through a three-way valve into the gas holder or stack 12 for venting gas just after the beginning and during the ending period of blowing.

The internal pressure in the cooler is continuously detected at the hood and controlled by the gas flow control valve 8. First of all, the internal pressure of the cooler 6 is controlled so that it is negative, air is positively sucked in through the clearance between the furnace mouth 3 and the lower end of the skirt 4 by lifting up the skirt 4 and at the same time oxygen is blown into the converter 1 through the oxygen blowing lance 5. The amount of air thus sucked in is adjusted to be at the level A in FIGURE 2, that is, $\frac{1}{3}$ to $\frac{2}{3}$ of the maximum amount of gas produced during the production cycle (at the level D in FIGURE 2). When CO gas is produced, it will be burned with the air sucked in and the non-reacted blowing oxygen. However, the air sucked in is so adjusted that the total amount of the burned gas and the residual air is the amount of the gas at the level A in FIGURE 2 and this mixture of gases is passed into the waste gas recovering apparatus and is pumped by the induced draft fan through a stack 12. Further, as mentioned above, by giving heat to the molten steel from the complete combustion of the produced gas, the desiliconing blowing can be accelerated and, by heating the skirt part by the complete combustion of the produced gas, the deposition of the slag on the skirt can be prevented. Any deposited metal, which has a melting point of about 1500° C., will not normally melt, because the temperature of the produced gas during the beginning period of blowing is about 1000° C., but it will melt and drop into the furnace during the burning of the produced gas, because the temperature of the burning gas will be from 1400° to 1800° C.

Figure 2:
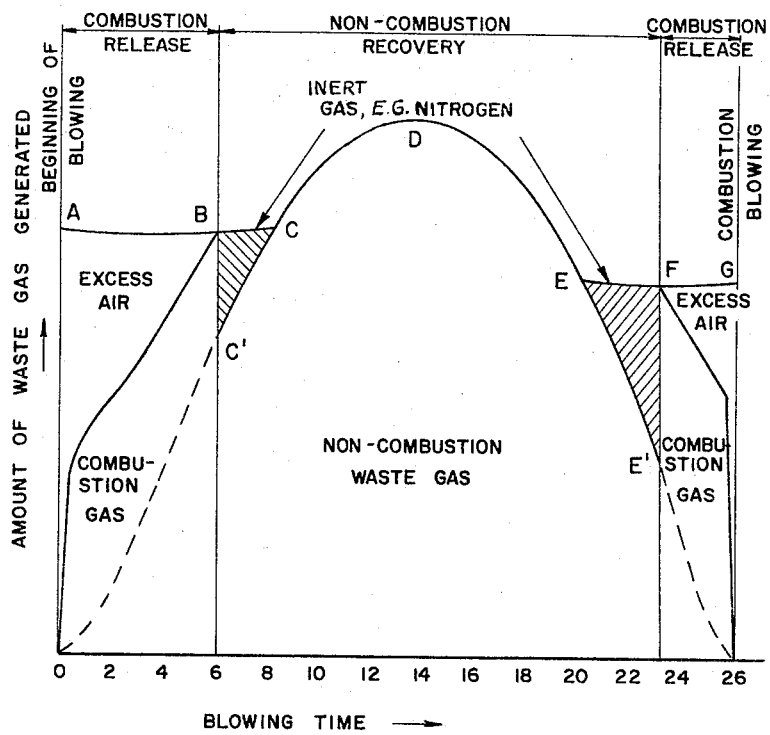
FIGURE 2 is a graph showing the recovery of produced waste gas by a curve representing the relation between the amount of the produced gas and the blowing time.

4 to 8 minutes after the beginning of blowing, the CO content of the produced gas will reach a level which makes it desirable to recover it. Then, the amount of air coming in through the clearance between the furnace mouth and the skirt seat is restricted and the three-way valve 11 is shifted to begin recovering the unburned produced gas into the gas holder 10. In FIGURE 2, between the points A and B, the produced gas is burned and the products of combustion are released. After 6 minutes, when the amount of the produced gas reaches the level C′, the amount of air sucked in is restricted and the unburned produced waste gas is recovered. The methods of restricting the air coming in are as follows:

(1) The internal pressure of the cooler is gradually made a positive by using a controller 8.

(2) Nitrogen is jetted out through the inert gas curtain forming ring 2 so as to form a nitrogen curtain and the clearance between the furnace mouth and the skirt seat is sealed.

(3) The skirt 4 is gradually lowered to make the clearance at the furnace mouth small.

(4) The above mentioned steps (1), (2) and (3) are combined.

Air is substantially excluded by any proper one of the above methods and only the produced gas is recovered.

In any case, the part of the area B C C′ in FIGURE 2 must be filled with some kind of gas to keep the amount of said gas flowing into the system constant at the level A. This is accomplished by adding an inert gas such as nitrogen, jetting it in through ports 4a leading into the interior of skirt 4 from chamber 4b. The jetting is stopped at point C when the amount of produced gas reaches level A–C.

The inert gas in the CO rich produced gas is not detrimental and does not reduce the value of the produced gas as a raw material. Thus, when the produced gas has been recovered in the gas holder 10 and the amount of the produced waste gas falls to the level E in FIGURE 2, that is, the amount of the produced gas has dropped to about ⅓ to ⅔ of the maximum amount (the level D in FIGURE 2), the CO rich waste gas again has an inert gas added thereto to fill the triangle EE′F so that the amount of the gas flowing through the recovering apparatus will remain about ⅓ to ⅔ of the maximum amount of produced gas, so that the load on the induced fan is maintained, under which load it can continue stabilized operation. When the amount of the produced gas falls to the level E′, the internal pressure of the cooler is again made negative, the skirt 4 is lifted up to increase the clearance between the furnace mouth and the skirt and air is positively sucked in to cause combustion of the produced gas. When this occurs, the level of the amount of gas rises to the point F which is the same as at the point E and the addition of the inert gas is stopped. At the same time the three-way valve 11 is shifted to lead the burned gas to the stack 12 and release the same. Thereafter, the amount of air is adjusted to keep a constant amount of the gas and a mixture of the products of combustion and the residual air is produced and is released until the blowing is finished. That is to say, during the time represented by the curve B C D E F, the unburned waste gas is recovered and, during the time represented by the curve F G (the ending period of blowing), that is during 2 to 10 minutes before the blowing is completed, the waste gas is completely burned by the same method as in the beginning period of the blowing, and the mixture of gases are discharged. Then, the finish of the blowing operation can be confirmed observing the flame color.

*Example*

Capacity of the test converter_____ 130 tons.
Charge of the molten pig iron ____ 103.4 tons.
Composition of the molten pig
  iron _____ 4.5% C; 0.5% Si; 0.87% Mn; 0.17% P; and 0.022% S.
Tapping amount _____ 111 tons.
Composition of the tapping _____ 0.04% C; 0.01% Si; 0.10% Mn; 0.020% P; and 0.019% S.

(I) About 4 minutes after the beginning of blowing, the clearance between the furnace mouth and the skirt seat was increased and air was introduced.

(a) Flow of the waste gas _____ About 30,000 Nm.³/hr.
(b) Temperature of the gas ____ 1,300–1,600° C.
(c) Hood pressure _____ 0∼–0.8 mm. Hg.
(d) Clearance between the furnace mouth and the skirt seat __ 240 mm.

(II) For 20 minutes, i.e. from 4 minutes to 24 minutes after the beginning of the blowing, the clearance between the furnace mouth and the skirt seat was substantially closed, the hood pressure was made positive and the furnace mouth was sealed with $N_2$ in operation.

(a) Amount of $N_2$ jetted in _____ 15,000 Nm.³/hr.
(b) Clearance between the furnace mouth and the skirt seat __ 100 mm.
(c) Flow of the gas _____ 30,000–50,000 Nm.³ hr.
(d) Temperatures of the waste gas _____ 1,520–1,540° C.
(e) Hood pressure _____ Kept at 1.3 mm. Hg.

(III) At 24 minutes after the beginning of the blowing, the clearance between the furnace mouth and the skirt seat was increased again and, at 26 minutes after the beginning, the blowing was stopped.

(a) Flow of the waste gas _____ 35,000 Nm.³/hr.
(b) Temperature of the gas ____ 1,400–1,600° C.
(c) Hood pressure _____ 0∼–1.0 mm. Hg.
(d) Clearance between the furnace mouth and the skirt seat __ 240 mm.

What is claimed is:

1. A method of recovering in a gas recovery system unburned waste gas issuing from an oxygen top-blowing converter during the refining of molten pig iron in the converter by blowing oxygen into said converter, comprising the steps of positively introducing air into the waste gas flowing from the converter into the recovery system during the initial period of blowing while the CO content of the waste gas is below the desired value, the air being introduced in an amount in excess of that necessary for burning the waste gas and in an amount which when combined with the products of combustion produces a gas flow at a level substantially above the amount of waste gas flowing from the converter at the end of said initial period and sufficient to effectively control the pressure within the gas recovery system by means of a damper installed in the recovery system, discharging burned gas and excess air from the recovery system; then when the CO content of the waste gas reaches the desired value, preventing the entry of air into the gas from the converter flowing into the recovery system, then introducing an inert gas into the gas flowing from the converter into the recovery system in an amount sufficient to maintain said level of the gas flow, terminating the input of inert gas when the gas flow from the converter reaches said level, recovering the waste gas flowing from the converter in an unburned state starting just after the air is excluded and the introduction of the inert gas has started and throughout the middle period of blowing; then just before the flow of gas from the converter falls below the said level, introducing inert gas into the waste gas in an amount sufficient to maintain said level of gas flow, and just before the CO content of the waste gas falls below the desired value, terminating the recovery of the unburned waste gas and introducing air into the waste gas flowing from the converter into the recovery system in an amount in excess of that necessary for burning the waste gas and in an amount which when combined with the products of combustion is sufficient to keep the level of gas flow substantially above the level of waste gas flow from the converter at the end of said middle period of blowing, and discharging the combustion gas and excess air from the recovery system.

2. A method as claimed in claim 1 in which the amount of air introduced during the initial and final stages of blowing for burning the waste gas and keeping the level of flow of gas at the said level is from ⅓ to ⅔ the greatest amount of waste gas flowing from the converter during the middle period of blowing.

3. A method as claimed in claim 1 in which the amount of inert gas which is added between the initial blowing and the period during which the flow of waste gas is greater than that at said level, is decreased as the amount of flow of the waste gas from the converter increases.

References Cited by the Examiner

UNITED STATES PATENTS 3,118,759   1/1964   Okaniwa et al. _____ 75—60

BENJAMIN HENKIN, *Primary Examiner.*